United States Patent [19]

De Gaetano et al.

[11] 4,418,016

[45] Nov. 29, 1983

[54] METHOD FOR RECOVERING OMEGA-AMINO-DODECANOIC ACID FROM CRYSTALLIZATION MOTHER LIQUORS

[75] Inventors: Mario De Gaetano, Cesano Maderno; Luigi Canavesi, Solbiate Olona, both of Italy

[73] Assignee: Snia Viscosa Societa Nazionale Industria Applicazioni Viscosa SpA, Milan, Italy

[21] Appl. No.: 292,423

[22] Filed: Aug. 14, 1981

Related U.S. Application Data

[63] Continuation of Ser. No. 161,468, Jun. 20, 1980, abandoned.

[30] Foreign Application Priority Data

Jun. 29, 1979 [IT] Italy .............................. 23990 A/79

[51] Int. Cl.$^3$ .......................... C09F 5/00; C11C 3/00

[52] U.S. Cl. .................................... 260/404; 260/419; 562/554

[58] Field of Search ................. 260/404, 419; 562/554

[56] References Cited

U.S. PATENT DOCUMENTS

| | | | |
|---|---|---|---|
| 2,871,247 | 1/1959 | Seon et al. | 260/404 |
| 4,054,588 | 10/1977 | Siclari et al. | 260/404 |
| 4,085,127 | 4/1978 | Siclari et al. | 260/404 |

*Primary Examiner*—Thomas A. Waltz

*Attorney, Agent, or Firm*—Hubbell, Cohen, Stiefel & Gross

[57] ABSTRACT

A process for recovering omega-amino-dodecanoic acid by separating the by-products from the crude acid that comprises, in the sequence indicated (a) treating the crude acid in the presence of water with an acid (A) in such an amount as to obtain an acid (A)/amino acid molar ratio comprised of between 2:1 and 1:1, the amount of water being such as to dissolve at least part of the salt obtained and not to dissolve at least part of the by-products, (b) separating the phases into one containing most of the salt and another containing most of the by-products, (c) decomposing the salt by treatment with an organic or inorganic base (B) and isolating the amino acid in the free state.

14 Claims, No Drawings

METHOD FOR RECOVERING OMEGA-AMINO-DODECANOIC ACID FROM CRYSTALLIZATION MOTHER LIQUORS

This is a continuation of application Ser. No. 161,468, filed June 20, 1980, now abandoned.

BACKGROUND OF THE INVENTION

1. Field of the Invention

This invention relates to a method for recovering omega-amino-dodecanoic acid from crystallization mother liquors.

The invention relates also to the omega-amino-dodecanoic acid obtained by the method of the present invention.

2. Prior Art

It is well known that the omega-amino-dodecanoic acid obtained by reducing 11-cyano-undecanoic acid with hydrogen, can be purified, by removing its by-products, by crystallization from hydroalcoholic mixtures in the presence of ammonia. However, by purifying the omega-amino-dodecanoic acid as mentioned above, substantial amounts of the omega-amino-dodecanoic acid itself, in addition to the by-products, remain dissolved in the crystallization mother liquors, thus considerably lowering the yield (which will be of about 85%) and increasing at the same time the problems connected with the disposal of said crystallization mother liquors.

SUMMARY OF THE INVENTION

It has now been unexpectedly found a method for recovering the crude omega-amino-dodecanoic acid whereby it is possible to obtain yields of above 90–95%.

Said method comprises first forming a water soluble salt of the omega-amino-dodecanoic acid, then separating said salt from the impurities present in said crude amino-acid, which are generally insoluble in water, decomposing subsequently said salt and isolating, by known method, the omega-amino-dodecanoic acid in its free form.

This invention relates thus to a method for recovering crude omega-amino-dodecanoic acid by separating the by-products from said crude acid, characterized by the fact that the following steps are carried out in the sequence indicated herebelow:

(a) the crude omega-amino-dodecanoic acid is treated, in the presence of water, with an acid (A) in such an amount, as to obtain an acid (A)/amino acid molar ratio from 2:1 to 1:1, preferably 1:5:1, the amount of water which is present being such as to dissolve at least part of the salt formed from the acid (A) with the amino-acid, and such as to not dissolve at least part of the by-products present in the crude amino-acid;

(b) the two phases which are obtained, are separated by known methods, the first one of these phases, comprising most of the salt of the amino-acid with the acid (A) while the other comprises most of the by-products;

(c) the salt of the amino-acid, contained in the first phase, is decomposed by treating it with a base (B), and the amino acid thus obtained in its free state is isolated by known methods.

DETAILED DESCRIPTION OF THE PREFERRED EMBODIMENTS

In accordance with the present invention as acid (A) both a mineral acid, for example sulphuric, phosphoric and the like, or an organic acid, for example acetic acid or the like, can be used.

The treatment of the crude omega-amino-dodecanoic acid is carried out, in accordance with the present invention, at a temperature comprised between 30° and 120° C. Thus, e.g. when sulphuric acid is used for the acid (A), the temperature is suitably maintained in the range between 60° C. and 90° C., preferably between 70° and 80° C.; when phosphoric acid is used, the temperature is maintained between 90° and 120° C., preferably between 95° and 105° C., while if acetic acid is used this temperature is maintained between 40° and 70° C., preferably between 45° and 55° C.

According to the present invention the amount of acid (A) used, with respect to the amount of water present, is maintained preferably within the following limits:

when sulphuric acid is employed, said acid is used in such an amount as to form an aqueous solution having a concentration of from 0.5 to 5%, preferably of from 1 to 2% by weight of $H_2SO_4$;

when phosphoric or acetic acid is used, the amount of said acid is such as to form an aqueous solution having a concentration of from 3 to 8%, preferably of about 5% by weight of said acid.

Obviously, instead of only one acid (A) a mixture of said acids may also be used according to the present invention.

As the base (B) both an inorganic compound, for example sodium or potassium carbonate, caustic soda or potash, and the like, or an organic compound, for example secondary or tertiary amines and the like, can be used.

In accordance with the present invention the treatment of the salt of the amino-acid with the base (B) is suitably carried out at a temperature in the range of from 60° to 130° C., preferably between 70° and 80° C. Naturally, instead of using only one base (B) a mixture of said bases can also be used.

Conveniently, but not necessarily, the crude omega-amino-dodecanoic acid, which is recovered in accordance with this invention, is derived from crystallization mother liquors used in the above mentioned process of the known art. Of course, the process according to the invention is suitable not only for recovering the omega-amino-dodecanoic acid obtained by reducing 11-cyano-undecanoic acid with hydrogen, but also for the recovery of the omega-amino-dodecanoic acid obtained by other known ways, as for example by reducing an unsaturated imino-acid with hydrogen and a metal catalyst of the Raney Nickel type or noble metals, etc.

This invention also relates to the omega-amino-dodecanoic acid recovered by the above disclosed process.

The following examples are to be considered as illustrative, and not at all limitative of the scope of the present invention.

EXAMPLE 1

The hydroalcoholic waters or liquors coming from the crystallization of 12-amino-dodecanoic acid are distilled for recovering the alcohol and the fractions which distill up to a temperature of 100° C. are collected.

The solutions comprise about 5% by weight of organic products of which about 50% are constituted by 12-amino-dodecanoic acid.

The solution is cooled to about 70° C. and then it is acidified with a 4 N (20% by weight) solution of $H_2SO_4$ until the solution comprises 2% by weight of $H_2SO_4$.

In this solution and at this temperature the by-products are insoluble, while the 12-amino-dodecanoic acid sulphate is soluble.

The solution is filtered at 70° C. and the mother liquors which contain pratically all the 12-amino-dodecanoic acid sulphate are treated at 70° C. with NaOH until a pH of about 9.5 is achieved. After cooling to room temperature, the precipitated omega-amino-dodecanoic acid is separated with a yield of above 90% with respect to the amount contained in the mother liquors.

EXAMPLE 2

The same solution, remaining after distillation up to 100° C. of the hydroalcoholic crystallization liquors, is cooled to 70° C. and acidified with glacial $CH_3COOH$ until the solution will contain 5% by weight of $CH_3COOH$. Then the solution is cooled to 45° C. and it is filtered at this temperature; in this case also the mother liquors containing about all the 12-amino-dodecanoic acid acetate are treated with potash under the same conditions indicated in Example 1 whereby practically the same results are obtained.

EXAMPLE 3

About the same results are obtained by substituting the above mentioned acids with phosphoric acid ($H_3PO_4$). The only difference consists in the fact that with this acid it is necessary to operate at a higher temperature (98° C.) both while acidifying and during the filtering, in order to have the 12-amino-dodecanoic acid phosphate remaining in the solution and to permit its recovery in the same way as indicated in the preceding examples.

What is claimed is:

1. A method for recovering omega-amino-dodecanoic acid by separating the by-products from said crude acid, comprising the following steps in the sequence indicated herebelow:

(a) treating the crude omega-amino-dodecanoic acid with an acid (A) in such an amount as to obtain an acid (A)/amino acid molar ratio between 2:1 and 1:1, in the presence of water in an amount to dissolve at least a part of the salt formed from the acid (A) with the amino-acid while not dissolving most of the by-products which are present in the crude amino acid whereby two phases are obtained;

(b) separating the two phases into a first phase containing most of the salt of the amino-acid with the acid (A), and a second phase containing most of the by-products;

(c) decomposing the salt of the amino-acid, in the first phase, by treating with an organic or inorganic base (B), to obtain free amino acid; and isolating said free amino acid.

2. A method according to claim 1, wherein acid (A) is sulphuric, acetic or phosphoric acid.

3. A method according to claim 2, wherein the acid (A) is sulphuric acid in such an amount, as to form an aqueous solution having a concentration of 0.5–5%, by weight of $H_2SO_4$.

4. A method according to claim 3, wherein the treatment with sulphuric acid is carried out at a temperature in the range from 60° to 90° C.

5. A method according to claim 4, wherein said treatment is carried out at a temperature of from 70° to 80° C.

6. A method according to claim 2, wherein the acid (A) is acetic or phosphoric acid in such an amount as to form an aqueous solution having a concentration of from 3 to 8%.

7. A method according to claim 6, wherein the acid (A) is acetic acid, and the temperature of the treatment is from 40° to 70° C.

8. A method according to claim 7, wherein said treatment is carried out at a temperature of 45°–55° C.

9. A method according to claim 6, wherein the acid (A) is phosphoric acid and the treatment temperature is from 90° to 120° C.

10. The method of claim 1 wherein the acid (A) amino acid molar ratio is 1.5:1.

11. The method of claim 3 wherein the concentration of the $H_2SO_4$ is from 1 to 2% by weight.

12. The method of claim 6 wherein the acid concentration is about 5% by weight.

13. A method according to any one of claims 1, 2, 3, 4, 5, 6, 7, 8, 9, 10, 11, or 12, wherein the decomposition of the salt of the amino-acid with the base (B) is carried out at temperature in the range of from 70° to 80° C.

14. A method according to any one of claims 1, 2, 3, 4, 5, 6, 7, 8, 9, 10, 11, or 12, wherein the base (B) is sodium or potassium hydroxide.

* * * * *